(12) United States Patent  (10) Patent No.: US 8,944,501 B2
Tseng  (45) Date of Patent: Feb. 3, 2015

(54) FLYING WING-SHAPED SEAT STRUCTURE

(71) Applicant: Shih-Yuan Tseng, Taipei (TW)

(72) Inventor: Shih-Yuan Tseng, Taipei (TW)

( * ) Notice: Subject to any disclaimer, the term of this patent is extended or adjusted under 35 U.S.C. 154(b) by 0 days.

(21) Appl. No.: 13/853,072

(22) Filed: Mar. 29, 2013

(65) Prior Publication Data

US 2013/0257116 A1  Oct. 3, 2013

(30) Foreign Application Priority Data

Mar. 29, 2012  (TW) .............................. 101205698 U

(51) Int. Cl.
  *B62J 1/00*  (2006.01)
(52) U.S. Cl.
  CPC . *B62J 1/002* (2013.01); *B62J 1/007* (2013.01)
  USPC .......................................... 297/201; 297/202
(58) Field of Classification Search
  USPC ....................... 297/201, 195.1, 202
  See application file for complete search history.

(56) References Cited

U.S. PATENT DOCUMENTS

| | | | | |
|---|---|---|---|---|
| 512,862 | A * | 1/1894 | Chatfield | 297/201 |
| 6,209,954 | B1 * | 4/2001 | Bombardier | 297/201 |
| 7,104,600 | B2 * | 9/2006 | Scholz | 297/201 |
| 7,976,102 | B2 * | 7/2011 | Chang | 297/201 |
| 2005/0173951 | A1 * | 8/2005 | Jalkanen | 297/201 |

* cited by examiner

*Primary Examiner* — Milton Nelson, Jr.

(57) ABSTRACT

A flying wing-shaped saddle comprises a saddle integrally formed by a plate body with a U-shaped trough for guiding airflow, a butterfly wings symmetrically extended from the left and right end of said trough respectively, which is used for sitting thereon, and a bow formed by a bent rod which comprises a fixing part, a buffering part and a support part, said fixing part formed by two rods disposed in parallel and fixed on the seat post of the bicycle, said buffering part formed by two rods extending from two front ends of said fixing part, said supporting part formed by two rods which are extended outwardly, diagonally and symmetrically from the two back ends of said fixing part.

7 Claims, 6 Drawing Sheets

FLYING WING-SHAPED SEAT STRUCTURE

FIELD OF THE INVENTION

The present invention involves a flying wing-shaped saddle structure, particularly to a flying wing-shaped saddle structure used on a bicycle or an electric bicycle.

BACKGROUND OF THE INVENTION

The bicycle has gained popularity in recent years for not only its convenience, but for also being eco-friendly function. It is now an indispensable part of the modern man's daily life for either transportation or recreation.

The present bicycle is usually equipped with a streamlined saddle. This structure however, is not only small but al-so with a smaller front end, which can cause pain in the crotch if being sat on for too long, as well as causing serious damage to the organs and nerves around the perineum.

Also, the traditional saddle structure is a hard type with either a flexible sponge or a foam structure built inside the sitting pad. While this can prevent serious friction when riding, it still has little effect on shock absorbing, which, while riding on bumpy roads, can cause serious damage to the buttocks, the ischium, and the spine, resulting in certain sports injury.

SUMMARY OF THE INVENTION

The aforementioned bicycle saddle has a smaller front end, along with a hard sitting pad that has little effect on shock absorbing, as well as no thermolysis nor ventilating effect, which can cause perineum pressure, buttock damage, riding discomfort, and worse, sports injuries, while cycling.

In response, how to provide a bicycle saddle that can resolve the aforementioned problems as well as provide a comfortable riding effect for the rider has become the main problem this present invention is to improve.

The present invention involves a flying wing-shaped saddle structure for the use of a bicyle or an electric bicycle, which comprises of a saddle, is integrally formed by a plate body with a U-shaped cross section, said U-shaped cross sectional part is a trough with a diversion ability, along with butterfly wings are symmetrically extended from the left and right end of said trough respectively, which formed a seating position for the rider's buttocks to sit on; and a bow, which is formed by a bent rod, comprises of a fixing part; a buffering part and a supporting part, said fixing part is formed by two rods disposed respectively on parallel, and fixed on the seat post of the bicycle, said buffering part is formed by two rods extending parallel from the two front ends of said fixing part, said supporting part is formed by two rods which are extended outwardly, diagonally and symmetrically from the 2 back ends of said fixing part.

BRIEF DESCIPTION OF DRAWINGS

Figure 1:
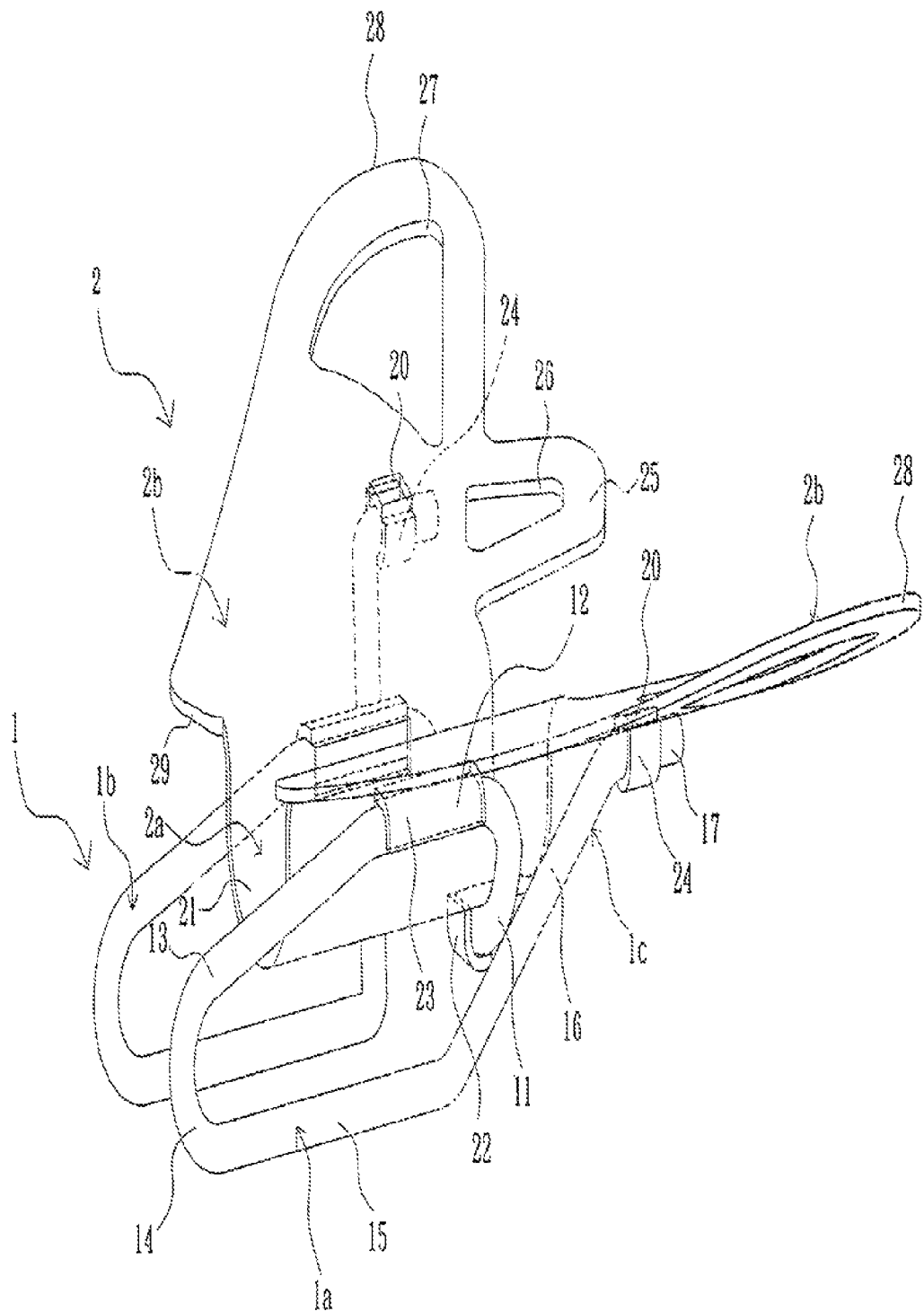
Figure 2:
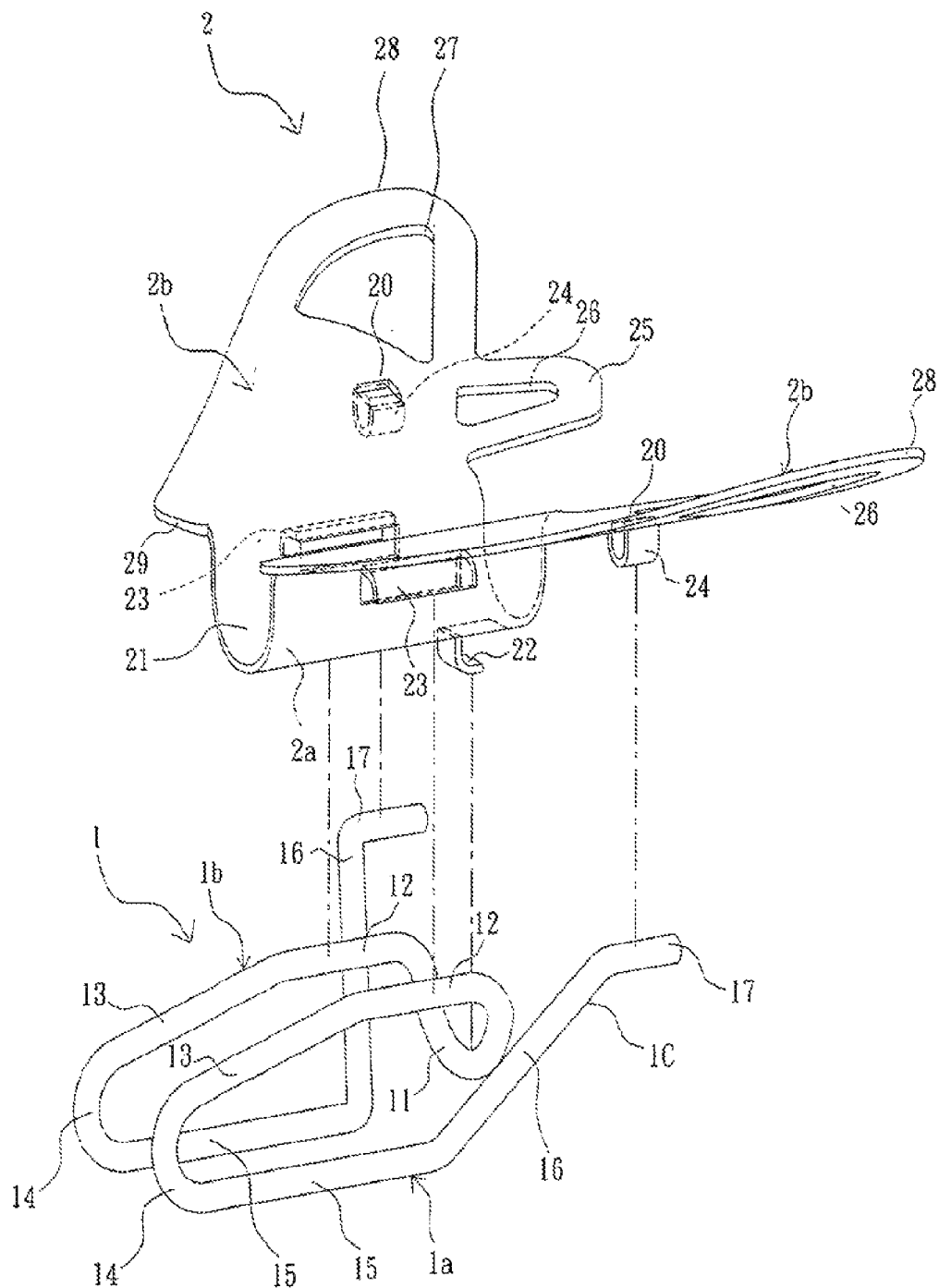
Figure 3:
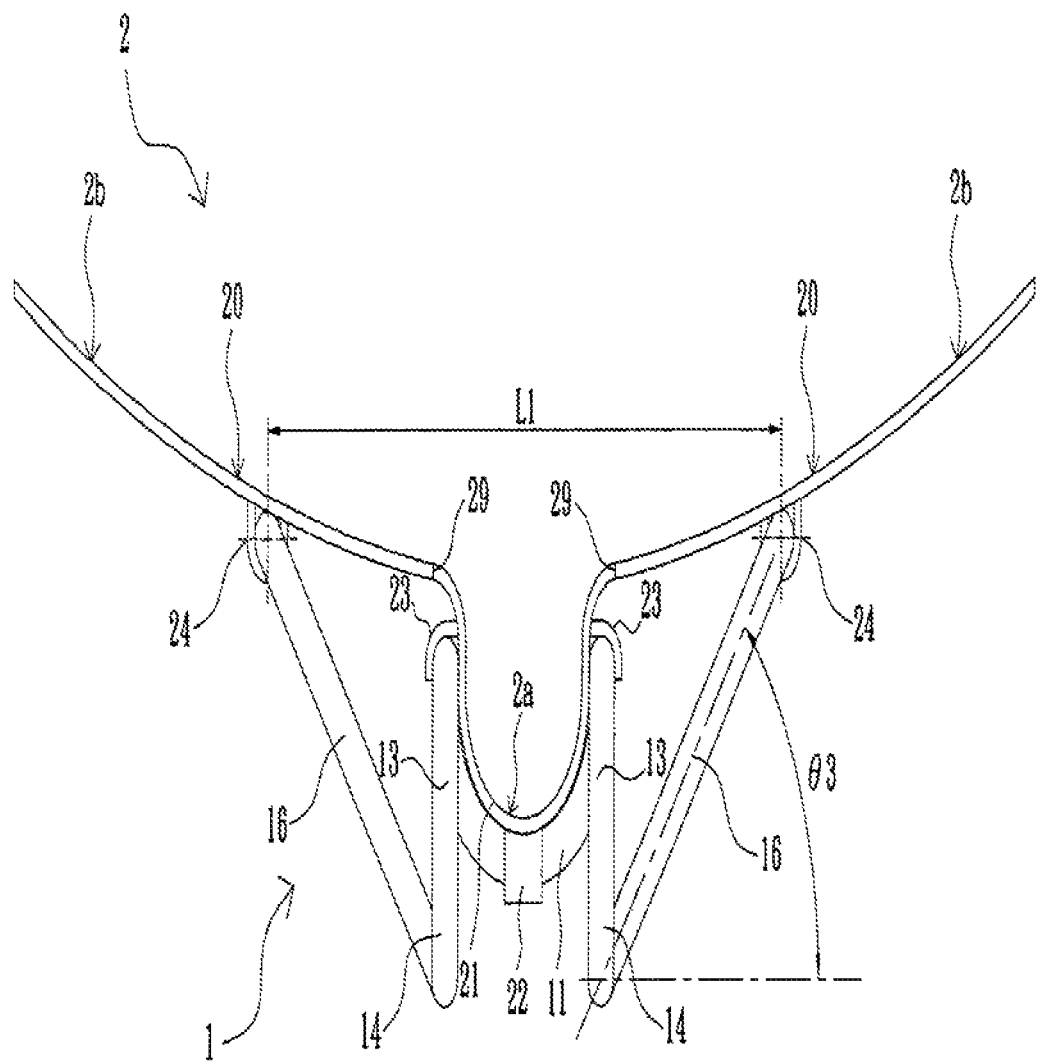
Figure 4:
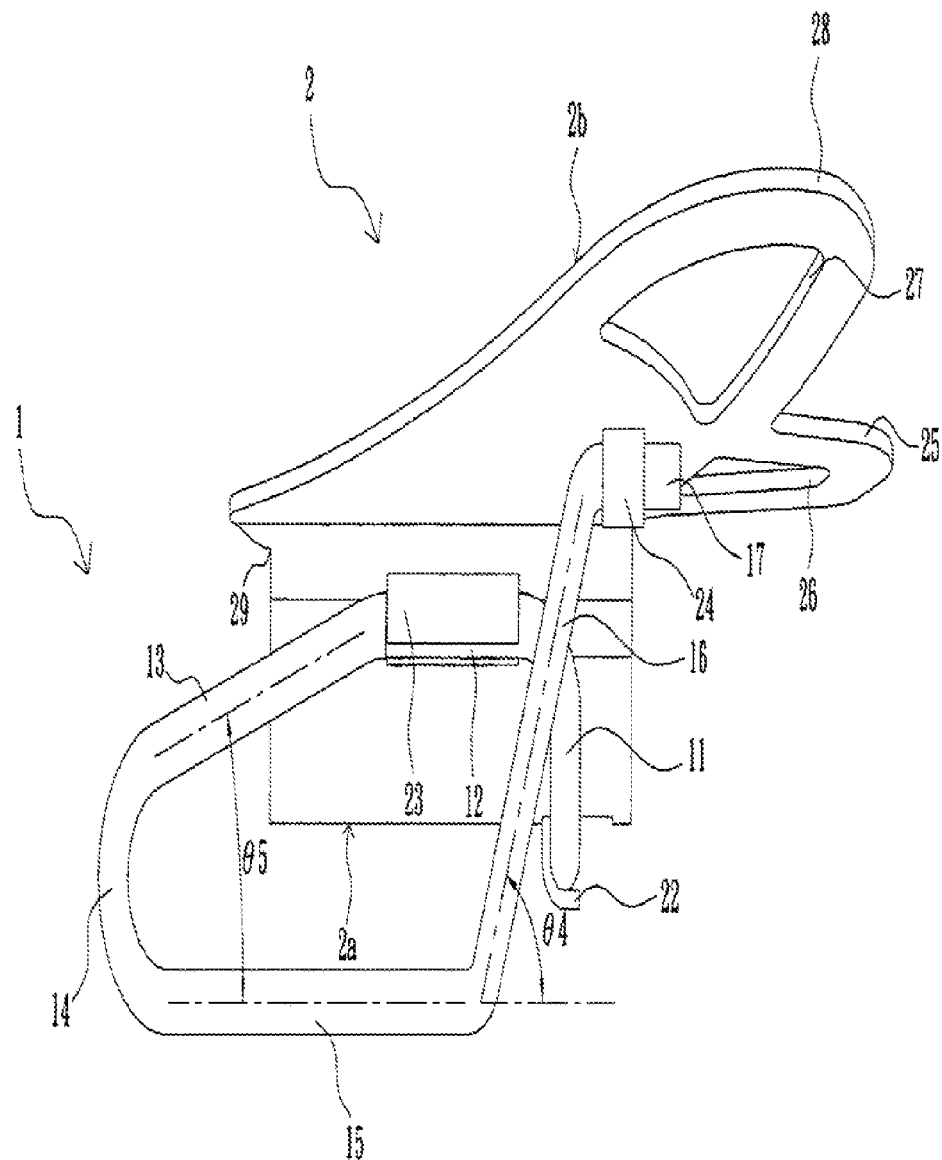
Figure 5:
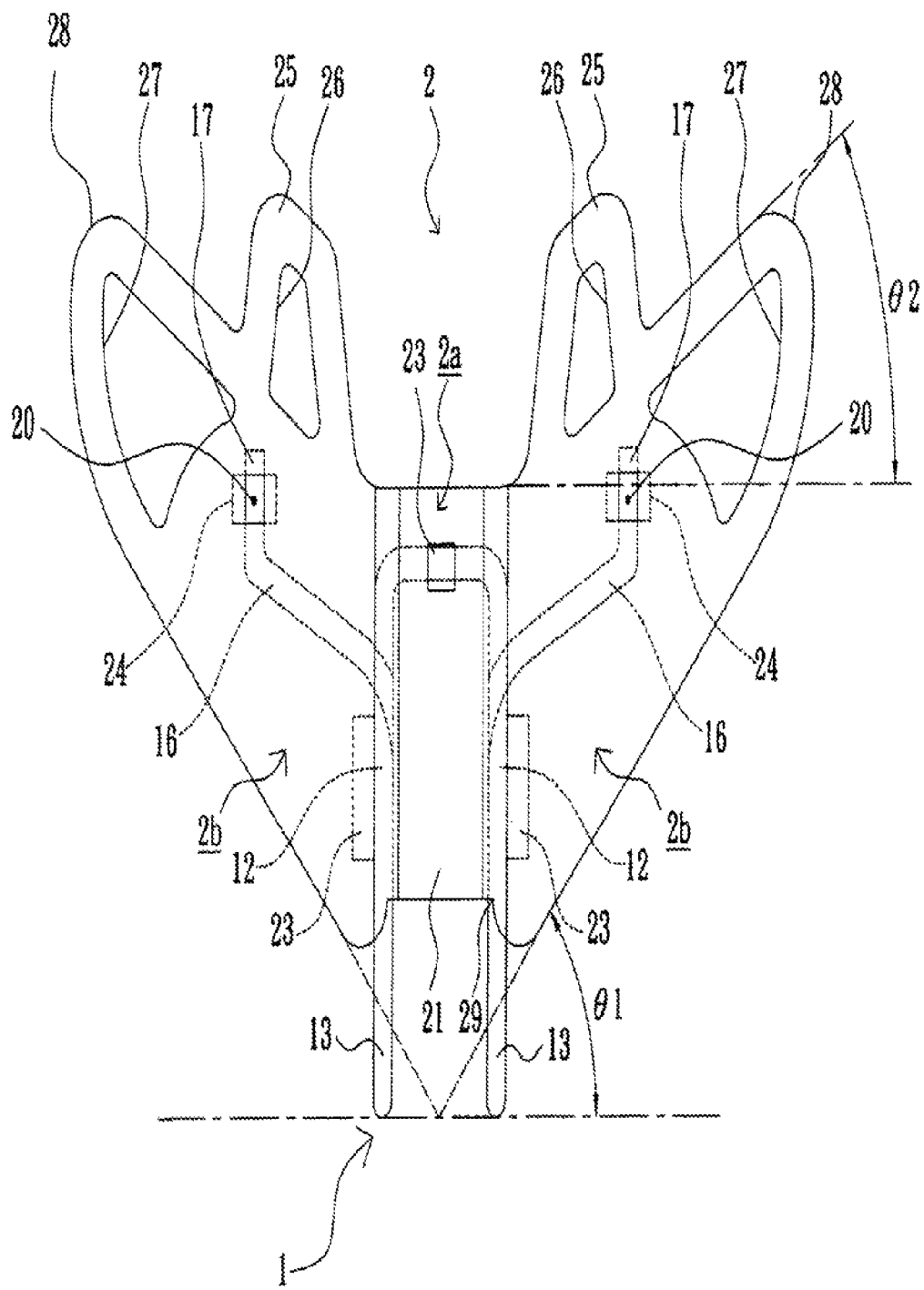
Figure 6:
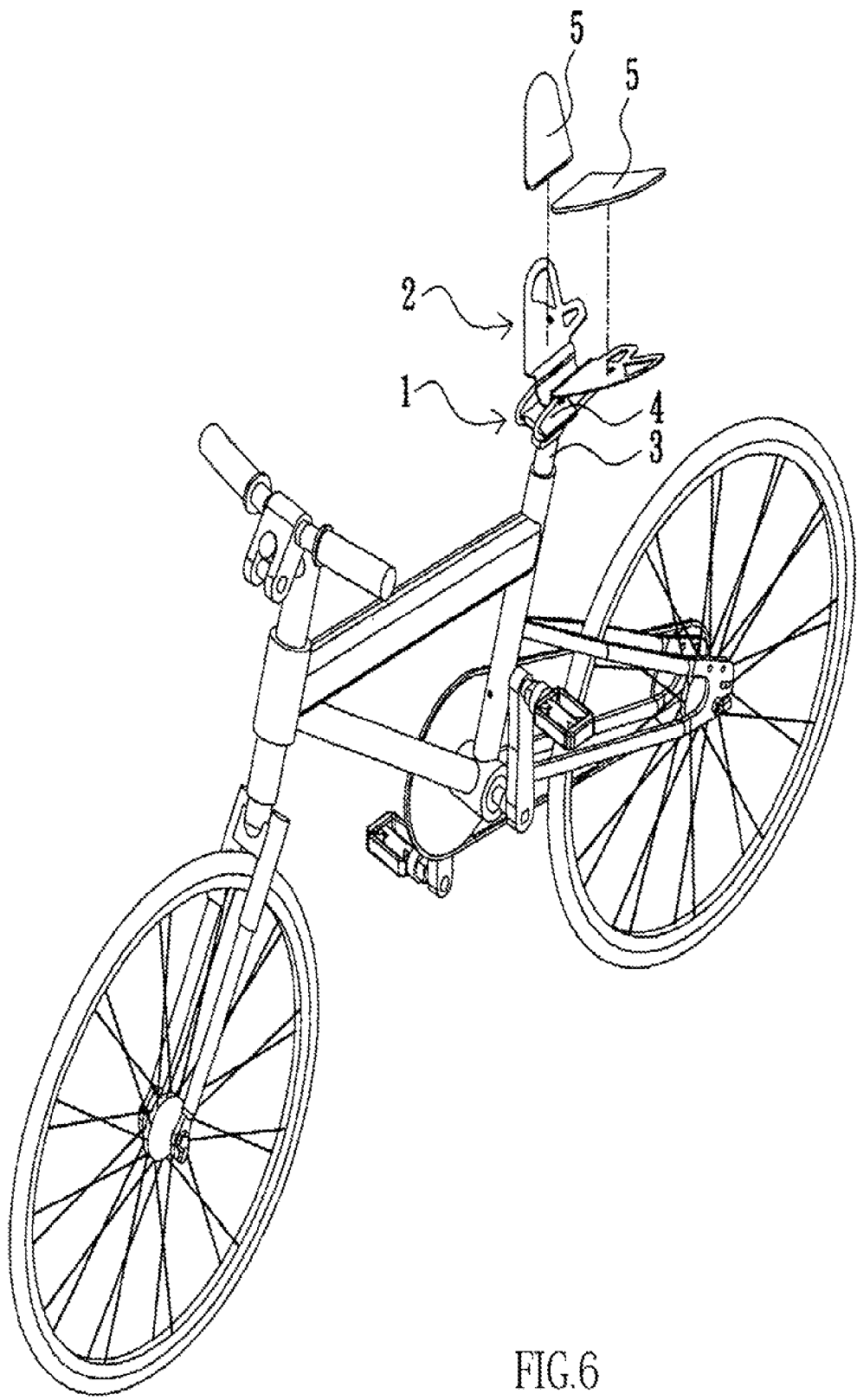

FIG. 1: A 3-Dimensional external view of the present invention.
FIG. 2: A 3-Dimensional exploded view of the present invention.
FIG. 3: A front view of the present invention.
FIG. 4: A right side view of the present invention.
FIG. 5: A top view of the present invention.
FIG. 6: A scheme of the practicing of the present invention with a bicycle.

DETAILED DESCRIPTION OF PREFERRED EMBODIMENT

The detailed description of the preferred embodiment of the present invention is as shown in the following drawings: FIG. 1 as a 3-D diagram of the present invention, FIG. 2 as a 3-D dissection diagram of the present invention, FIG. 3 as a front view of the present invention, FIG. 4 as a right side view of the present invention, FIG. 5 as a top view of the present invention, and FIG. 6 as an operating principle diagram for showing the practicing of the present invention.

As shown in FIG. 1 & FIG. 2, a flying wing-shaped saddle structure comprises a saddle (2) which is a one-piece plate body with a U-shaped trough (2a) configured to guide airflow, and with two butterfly wings (2b) configured to sit thereon, wherein the butterfly wings (2b) are arranged symmetrically and connected with two side of the trough (2a) respectively;

a bow (1) formed by a bent rod, which comprises of three parts, the first part is a fixing part (1a) formed by two parallel rods used for fixing on a seatpost of the bicycle, the second part is a buffering part (1b) which is flexible for buffering the gravity generated by the rider, formed by two parallel rods extended in parallel from two front ends of the fixing part (1a) and connected each other in its back end, said buffering part (1b) being used for absorbing impact, and the third part is a supporting part (1c) comprising two symmetrical rods extended from two back ends of the fixing part (1a) and tilted outwardly in a rear end thereof; and said trough (2a) is placed on a top of said buffering part (1b) the butterfly wings (2b) fixed on the top of the buffering part (1b) and the supporting part (1c) whereby, the saddle (2) with the bow (1) produce excellent flexibility and supporting abilities to absorb the shock of road bumpy.

A groove (21) of the saddle (2) is placed under the human's perineum (including the Groin, the Prostate, and the Anus). When riding a bicycle, said groove (21) allows the air to flow smoothly from front to back thereof, it has the advantage of the good flowing ability. This can also prevent the rider's groin from feeling hot and unbearable, as well as preventing the rider's weight from crushing his perineum and avoiding friction with the saddle (2).

The butterfly wing (2b) is provided with a tail wing (25) in rear edge for supporting a rider's butt.

Said tail wings (25) not only expands the area of the saddle (2), but also sticks to the buttocks' rear part. This provides the rider with a comfortable and smooth ride, along with a sense of futuristic and streamlined visual design effect.

The saddle (2) is integrally formed by a plate body, with the material being either metal, plastic steel or flexible fiber. The bow (1) is formed by the bending of a Three-dimensional wire bending machine. Because they are integrally formed and easy to assemble, thus, the present invention fits the request of standardization and mass-production, providing economic benefits.

Also, the left and right edges of said butterfly wings (2b) further comprises holes (26) (27) for air ventilation. The holes (26) are disposed on said tail wing (25), while the other holes (27) are disposed on the end edge of each said butterfly wing (2b). Said hole are not limited to its number and size. As shown in the whole drawings, the two holes (26) (27) are two large holes in each side. As the size of the holes are smaller, the number of the holes will be increased accordingly.

As shown in FIG. 3, said saddle (2), as viewing from the front, shows that the left and right of the two said butterfly wing (2b) are extended outwards and upwards with a slight bend from the left and right of the trough (2a). This slightly arcuate shape also matches the arcuate shape of the human's buttocks, matching the design of ergonomics.

As shown in FIG. 5, viewing from the top, the said two left and right Butterfly Wings butterfly wing (2b) are two delta wings that are tilted backwards, with the front edges and back edges of said delta wings swept backwards, and the shape of the free end is a circular end (28) with a circular angle. Therefore, no injuries will occur upon touching the circular end (28). The angle (θ1) between the delta wing's front edge and the horizon is 45 degrees, while the angle (θ2), between the delta wing's back edge and the horizon is 45 degrees. The two aforementioned angle (θ1 & θ2) are not quite restricted, as they have a changeable angle at around 10 degrees plus or minus. However, no matter what the changes are, the said two left and right butterfly wing (2b) both shrink gradually towards the free ends, and they remain delta wings that are tilted backwards. Through this arrangement, the rider can face neither interruption nor jamming during the movements of their legs while cycling.

Also, as shown in FIG. 2 & FIG. 5, a Concave Gap (29) is formed on the front end of the saddle (2) left and right butterfly wings (2b), with its most concaved point positioned above the front edge opening of said trough (2a), which is also where the left and right butterfly wings (2b) connect with it. When a rider sits on the saddle (2), the gap (29) happens to be under the male rider's reproductive organs, which can prevent a friction with said saddle (2) while cycling, as well as maintaining that area's ventilating and cooling effect.

Secondly, as shown in FIG. 2, the fixing part (1a) of the bow (1) consist of two straight rods (15) in parallel, wherein the buffering part (1b) consists of a half circular rod (11), two horizontal rods (12) arranged in parallel and connected vertically with the half circular rod (11), two tilting rods (13) connected with the two horizontal rods (12) and disposed in downslope, and two parallel bent rods (14), of which one end is connected with the tilting rods (3), and the other end is connected with the straight rods (15); and a L-shaped hook (22) is arranged under the trough (2a) adjacent to one side for receiving the half circular rod (11).

Also, the butterfly wing (2b) is provided with two stress points (20) and two lugs (24) disposed therebelow, the distance (L1) between two stress points (20) is ten to fifteen cm; and the fixing part (1a) of the bow (1) is consist of the two parallel straight rods (15), wherein the supporting part (1c) is consist of two expansion rods (16) connected with the straight rods (15) and tilted outward, and two insertion rods (17) connected with the expansion rods (16) for inserting into the lug (24).

The butterfly wing (2b) is provided with two stress points (20) and two lugs (24) disposed therebelow, the distance (L1) between two stress points (20) is ten to fifteen cm; and the fixing part (1a) of the bow (1) is consist of the two parallel straight rods (15), wherein the supporting part (1c) is consist of two expansion rods (16) connected with the straight rods (15) and tilted outward, and two insertion rods (17) connected with the expansion rods (16) for inserting into the lug (24).

In addition, the trough (2a) is provided with two clamps (23) disposed in two outside walls thereof for fixing the horizontal rod (12).

Said saddle (2) and bow (1) are solidly fixed effect through three fixing relationships—the hook (22) and the half-circular Rods (11), the clamps (23) and the horizontal rods (12), the lugs (24) and the insertion rods (17). These three fixing relationships ensure that the saddle (2) would not move from the bow (1) in either direction, achieving a sturdy fixed relationship. Also, the saddle (2) and bow (1) can be quickly assembled through the three fixing structures in a working environment without extra tools and fixing components, whereby; the present invention has the advantages of the efficiency for quick assembly and saving the time.

As shown in FIG. 3 & FIG. 4, said expansion rods (16) has a side angle (θ3) formed by outward tilting, the ideal angle for said Included Angle (θ3) is 45 degrees. Said expansion rods (16) also has a backward angle (θ4) from the horizon due to backward tilting, and the ideal angle for said backward angle (θ4) is 60 degrees. Through these two said Included Angle, the two expansion rods (16) can produce effective buffering effects after receiving pressure from the saddle (2).

From the aforementioned, if the side angle (θ3) is more than 60 degrees from the horizon, the two expansion rods (16) would rise upward towards a straight angle, raising, the height of the two left and right butterfly wings (2b) and decreasing the sitting area, making the rider feels uncomfortable when sitting due to concentrated stress area on buttocks. In the other hand, if the angle of side angle (θ3) is lower than 30 degrees from the horizon, the two expansion rods (16) would approach Horizontal, lowering the height of the two left and right butterfly wings (2b) and decreasing the buffering effects considerably. Hence, as aforementioned, 45 degrees or an angle close to it would serve as the ideal angle for the side angle (θ3).

From the aforementioned, if the backward angle (θ4)'s angle is more than 70 degrees from the horizon, this would make the height of the two left and right butterfly wings (2b) back higher than the front, causing to saddle (2) to tilt forward, making the rider feels uncomfortable due to the barycenter tilts forward. In the other hand, if the angle of the backward angle (θ4) is lower than 50 degrees from the horizon, the two expansion rods (16) would tilt downwards, making the height of the two left and right butterfly wings (2b) back lower than the front, causing the saddle (2) to recline and making the rider's barycenter recline, therefore, the rider is hardly staying stable when riding and bringing him close to danger. Hence, as aforementioned, 60 degrees or an angle close to it would serve as the ideal angle for the backward angle (θ4).

As mentioned above, the ideal angle for the angle (θ5) between the parallel and straight rod (15) at one end of said bent rod (14) and the tilting, rod (13) at said bent rod (14) other end would be near 30 degrees. When said angle is more than 45 degrees, the front of said two butterfly wings (2b) would be higher than the back, resulting in the saddle's (2) recline and the bow (1) unable to produce its buffering effects efficiently. In the other hand, if said angle is less than 20 degrees, the front of said two butterfly wings (2b) would be lower than the back, causing the saddle (2) to plunge as well as the buffering effects to be insufficient. Therefore, as aforementioned, 30 degrees or an angle close to it would serve as the ideal angle for the angle (θ5).

From the aforementioned, after comparing the heights of the buffering part (1b) and supporting part (1c) the shock force can be absorbed and reduced by the bow (1) when riding on bumpy roads, brining the shock factor to less than 1 and considerably decreasing the force taken by the buttocks.

Referring to FIG. 6 again, said fixing part (1a) is fixed on the pillar part of the bicycle saddle (3) by a (4) along with other fixing components (undisclosed, as they are from older types). Also, said saddle (2) surface is combined with a sitting pad (5) that has either flexibility or buffering abilities. The saddle (2) is preferably made of one of the following materials: a sponge pad, a styrofoam pad, a foam pad, a latex pad, a flexible pu pad, a flexible pvc pad, a flexible silica gel pad, a flexible air pad, and a flexible skid-proof pad or a mixture of above material.

The above description with drawings is the best but not only embodiment of present invention, the modifications and variations according to the scope of present invention may comprise features claimed hereafter.

What is claimed is:

1. A flying wing-shaped saddle structure comprising
    a saddle (2) which is a one-piece plate body with a U-shaped trough (2a) configured to guide airflow, and with two butterfly wings (2b) configured to sit thereon, wherein the butterfly wings (2b) are arranged symmetrically and connected with two sides of the trough (2a) respectively;
    a bow (1) formed by a bent rod which comprises fixing parts (1a) that are two parallel rods used for fixing on a seatpost, buffering parts (1b) that have a pair of parallel rods used for absorbing impact, one end of said pair of parallel rods connected with a front end of said fixing parts (1a) and another end of said pair of parallel rods connected to each other, and supporting parts (1c) that are two symmetrical rods extended from a back end of the fixing parts (1a) and tilted outwardly in a rear end of said supporting parts (1c); and
        wherein the trough (2a) is placed on the top of said buffering parts (1b) and the butterfly wings (2b) are fixed on the top of the buffering parts (1b) and the supporting parts (1c);
    wherein the buffering part (1b) comprises, a half circular rod (11), two horizontal rods (12) arranged in parallel and connected vertically with the half circular rod (11), two tilting rods (13) connected with the two horizontal rods (12) and disposed in downslope, and two parallel bent rods (14), of which one end is connected with the tilting rods (3) and the other end is connected with the straight rods (15); and
    a L-shaped hook (22) is arranged under the trough (2a) adjacent to one side for receiving the half circular rod (11);
    wherein the butterfly wing (2b) is provided with two stress points (20) and two lugs (24) disposed therebelow, a distance (L1) between said two stress points (20) is ten to fifteen cm; and
    wherein the supporting part (1c) comprises two expansion rods (16) connected with one end of the straight rods (15) and tilted outward, and two insertion rods (17) connected with the expansion rods (16) for inserting into the lug (24); the position of said insertion rods (17) being higher than said two horizontal rods (12) of said buffering part (1b);
    wherein said butterfly wing (2b) is provided with holes (26, 27) for air ventilation.

2. The flying wing-shaped saddle structure according to claim 1, characterized in that
    the shape of said butterfly wings (2b) of the saddle (2) is an upward curve extended from the top of the trough (2a) in front view, and is a delta wing with a round wing tip (28) in top view.

3. The flying wing-shaped saddle structure according to claim 2, characterized in that
    the butterfly wing (2b) is provided with a tail wing (25) in one edge for supporting a rider's butt.

4. The flying wing-shaped saddle structure according to claim 1, characterized in that
    the butterfly wing (2b) of the saddle (2) is provided with two concave gaps (29) disposed in one end thereof, whereat the deepest point is an open end of one edge above the trough (2a).

5. The flying wing-shaped saddle structure according to claim 1, characterized in that
    the saddle (2) is made of one of the following materials: a sponge pad, a styrofoam pad, a foam pad, a latex pad, a flexible pu pad, a flexible pvc pad, a flexible silica gel pad, a flexible air pad, and a flexible skid-proof pad or a mixture of above materials.

6. The flying wing-shaped saddle structure according to claim 1 is characterized in that two sides of the expansion rod (16) have an inclination angle ($\theta 3$) of 45 degrees to a level, and rear sides of the expansion rod (16) have an inclination angle ($\theta 4$) of 60 degrees to the level.

7. The flying wing-shaped saddle structure according to claim 1, characterized in that
    the trough (2a) is provided with two clamps (23) disposed in two outside walls thereof for fixing the horizontal rod (12).

* * * * *